United States Patent
Ueki et al.

(10) Patent No.: US 9,682,574 B2
(45) Date of Patent: *Jun. 20, 2017

(54) RECORDING APPARATUS AND RECORDING METHOD

(71) Applicant: FUJI XEROX CO., LTD., Tokyo (JP)

(72) Inventors: Hiroyuki Ueki, Kanagawa (JP); Mami Hatanaka, Kanagawa (JP); Toshitake Yui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,411

(22) Filed: Jul. 28, 2014

(65) Prior Publication Data

US 2015/0251456 A1 Sep. 10, 2015

(30) Foreign Application Priority Data

Mar. 5, 2014 (JP) ................. 2014-043238

(51) Int. Cl.
| | |
|---|---|
| *B41M 5/00* | (2006.01) |
| *B41J 11/00* | (2006.01) |
| *C09D 11/322* | (2014.01) |
| *C09D 11/38* | (2014.01) |
| *B41J 2/01* | (2006.01) |

(52) U.S. Cl.
CPC .......... *B41J 11/0015* (2013.01); *B41J 11/002* (2013.01); *B41M 5/0023* (2013.01); *C09D 11/322* (2013.01); *C09D 11/38* (2013.01); *B41J 2/01* (2013.01)

(58) Field of Classification Search
CPC ........ B41J 11/0015; B41J 11/002; B41J 2/01; B41M 5/0023; C09D 11/322; C09D 11/38
See application file for complete search history.

(56) References Cited

U.S. PATENT DOCUMENTS 9,447,300 B2 * 9/2016 Ueki ................. C09D 11/10
2005/0244593 A1 11/2005 Koga et al.
(Continued)

FOREIGN PATENT DOCUMENTS

| CN | 1689832 A | 11/2005 |
|---|---|---|
| CN | 1727413 A | 2/2006 |

(Continued)

OTHER PUBLICATIONS

Jul. 18, 2016 Office Action issued in Chinese Patent Application No. 201410448910.6.
(Continued)

*Primary Examiner* — Manish S Shah
*Assistant Examiner* — Yaovi M Ameh
(74) *Attorney, Agent, or Firm* — Oliff PLC

(57) ABSTRACT

A recording apparatus includes an ejecting head that ejects aqueous ink which includes a colorant, polymer particles, water, and an aqueous organic solvent, of which static surface tension is from 22 mN/m to 30 mN/m, and a difference between a value of dynamic surface tension after 10 msec and a value of dynamic surface tension after 1000 msec is greater than 2 mN/m and equal to or smaller than 10 mN/m, when dynamic surface tension is measured with a maximum bubble pressure technique, in an the ink droplet amount in a range of less than 10 pl.

8 Claims, 4 Drawing Sheets

(56) References Cited

U.S. PATENT DOCUMENTS

| | | | |
|---|---|---|---|
| 2007/0186812 A1* | 8/2007 | Koga | C09D 11/40 106/31.58 |
| 2011/0118399 A1* | 5/2011 | Koganehira | C09D 11/322 524/377 |
| 2011/0242200 A1* | 10/2011 | Tojo | B41M 7/009 347/21 |
| 2012/0105541 A1 | 5/2012 | Inoue et al. | |
| 2015/0267067 A1* | 9/2015 | Ueki | C09D 11/10 347/20 |

FOREIGN PATENT DOCUMENTS

| | | | |
|---|---|---|---|
| CN | 102248777 A | 11/2011 | |
| JP | 2005-200566 * | 7/2005 | C09D 11/00 |
| JP | A-2006-219625 | 8/2006 | |
| JP | 2007-217532 A | 8/2007 | |
| JP | 2008001003 A | 1/2008 | |
| JP | 2008-308663 A | 12/2008 | |
| JP | 2010-047700 A | 3/2010 | |
| JP | 2011-079952 A | 4/2011 | |
| JP | 2011-127088 A | 6/2011 | |
| JP | A-2011-127088 | 6/2011 | |
| JP | 2011-212938 A | 10/2011 | |
| JP | 2011-228619 A | 11/2011 | |
| JP | 2012-051286 A | 3/2012 | |
| JP | 2012-096436 A | 5/2012 | |
| JP | 2012-184365 A | 9/2012 | |
| JP | 2014-195986 A | 10/2014 | |
| JP | 2014-224248 A | 12/2014 | |
| JP | 2015-044405 A | 3/2015 | |
| WO | 2013/131924 A1 | 9/2013 | |

OTHER PUBLICATIONS

Mar. 15, 2017 Office Action issued in Chinese Patent Application No. 201410448910.6.

Mar. 21, 2017 Office Action issued in Japanese Patent Application No. 2014-043238.

* cited by examiner

RECORDING APPARATUS AND RECORDING METHOD

CROSS-REFERENCE TO RELATED APPLICATIONS

This application is based on and claims priority under 35 USC 119 from Japanese Patent Application No. 2014-043238 filed Mar. 5, 2014.

BACKGROUND

Technical Field

The present invention relates to a recording apparatus and a recording method.

SUMMARY

According to an aspect of the invention, there is provided a recording apparatus including:

an ejecting head that ejects aqueous ink which includes a colorant, polymer particles, water, and an aqueous organic solvent, of which static surface tension is from 22 mN/m to 30 mN/m, and a difference between a value of dynamic surface tension after 10 msec and a value of dynamic surface tension after 1000 msec is equal to or smaller than 2 mN/m, when dynamic surface tension is measured with a maximum bubble pressure technique, in an ink droplet amount in a range of 10 pl to 15 pl.

BRIEF DESCRIPTION OF THE DRAWINGS

Exemplary embodiments of the present invention will be described in detail based on the following figures, wherein:

FIGS. 2A to 2C are schematic views for illustrating a mechanism of generation of a stripe-like image defect due to landing interference of an ink droplet, in which FIG. 2A is a schematic view showing a state immediately before ink to be landed later lands on a recording medium, FIG. 2B is a schematic view showing a state where landing interference of an ink droplet occurs and a stripe-like image defect is generated, and FIG. 2C is a schematic view showing a state where no landing interference of an ink droplet occurs and no stripe-like image defect is generated;

FIGS. 3A and 3B are schematic views showing states of landing of ink droplets of a first embodiment of a recording apparatus according to the exemplary embodiment, in which FIG. 3A is a schematic view showing a state immediately after a later ink droplet has landed, and FIG. 3B is a schematic view showing a state where a previous ink droplet and a later ink droplet are coalesced with each other, after the later ink droplet has landed; and FIGS. 4A and 4B are schematic views showing states of landing of ink droplets of a second embodiment of a recording apparatus according to the exemplary embodiment, in which FIG. 4A is a schematic view showing a state immediately after a later ink droplet has landed, and FIG. 4B is a schematic view showing a state where a previous ink droplet and a later ink droplet are coalesced with each other, after the later ink droplet has landed.

DETAILED DESCRIPTION

Hereinafter, exemplary embodiments which are one example of the invention will be described in detail.

Figure 1:
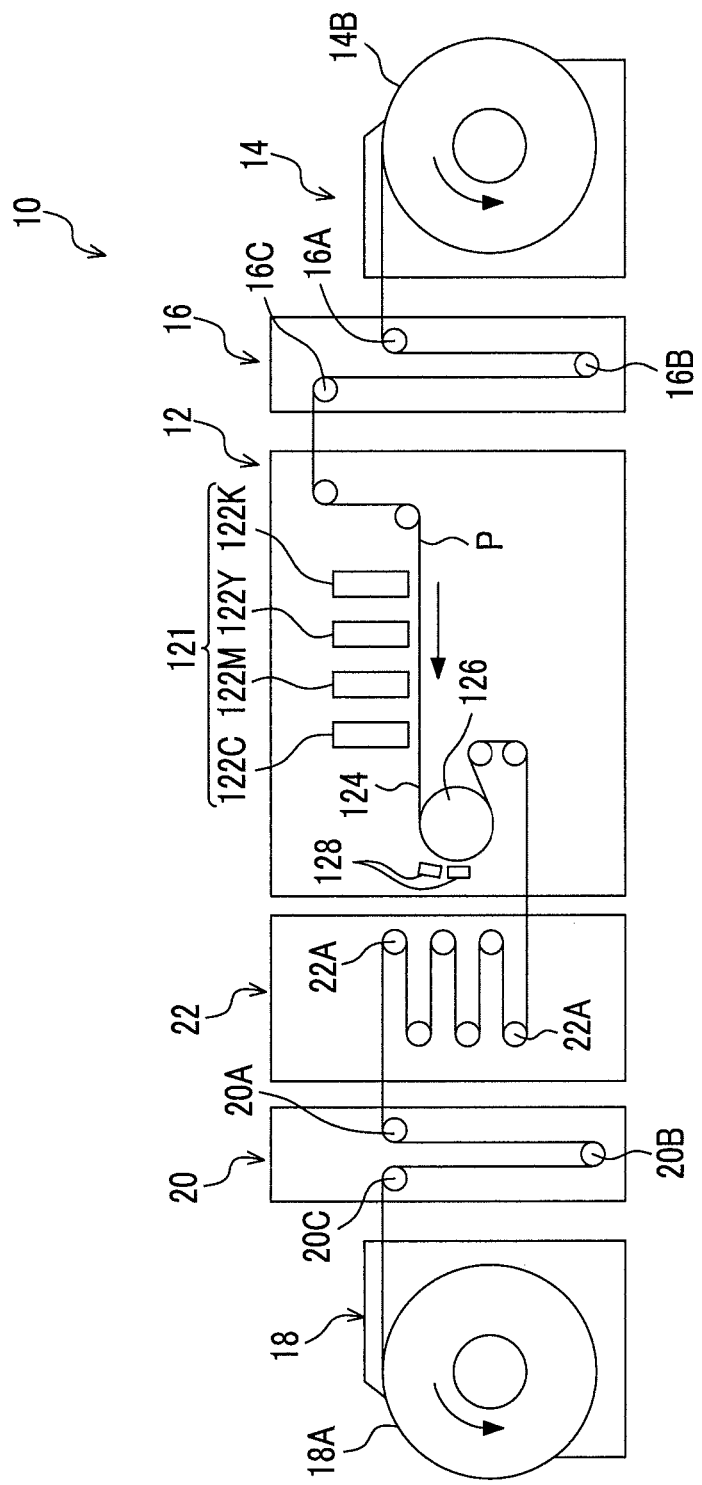
FIG. 1 is a schematic configuration diagram showing a recording apparatus according to the exemplary embodiment.

FIG. 1 is a schematic configuration diagram showing a recording apparatus according to the exemplary embodiment.

As shown in FIG. 1, a recording apparatus 10 according to the exemplary embodiment includes an ejecting head 122 (ejecting device 121 including the ejecting head 122) which ejects aqueous ink (hereinafter, also referred to as "ink") onto a non-permeable recording medium P. The recording apparatus 10 according to the exemplary embodiment realizes a recording method including an ejection step of ejecting the ink onto the non-permeable recording medium P. Accordingly, an image is recorded on the non-permeable recording medium P with the ink.

In detail, the recording apparatus 10 according to the exemplary embodiment includes an image recording unit 12 which records an image on continuous paper as the non-permeable recording medium P (hereinafter, also referred to as "continuous paper P").

The recording apparatus 10 includes a preprocessing unit 14 which accommodates the continuous paper P supplied to the image recording unit 12, and a buffer unit 16 which adjusts a feeding amount of the continuous paper P supplied to the image recording unit 12 from the preprocessing unit 14. The buffer unit 16 is disposed between the image recording unit 12 and the preprocessing unit 14.

The recording apparatus 10, for example, includes an after-processing unit 18 which accommodates the continuous paper P discharged from the image recording unit 12, and a buffer unit 20 which adjusts a feeding amount of the continuous paper P discharged from the image recording unit 12 to the after-processing unit 18. The buffer unit 20 is disposed between the image recording unit 12 and the after-processing unit 18.

The recording apparatus 10 includes a cooling unit 22 which is disposed between the image recording unit 12 and the buffer unit 20, and cools the continuous paper P discharged from the image recording unit 12.

The image recording unit 12, for example, includes a roller member (reference number omitted) which guides the continuous paper P along a feeding path 124 of the continuous paper P, and an ejecting device 121 which ejects the ink (ink droplets) onto the continuous paper P transported along the feeding path 124 of the continuous paper P and records an image.

The ejecting device 121 includes the ejecting head 122 which ejects the ink onto the continuous paper P. The ejecting head 122 is, for example, a long recording head in which an effective recording area (area where nozzles for ejecting the ink are disposed) is equal to or greater than a width of the continuous paper P (a length of the continuous paper P in a direction intersecting (for example, orthogonal to) the feeding direction of the continuous paper).

The ejecting head 122 is not limited thereto, and may be a short ejecting head which has a smaller effective recording area than the width of the continuous paper P and has a system of moving in a width direction of the continuous paper P and ejecting the ink (so-called carriage system).

The ejecting head 122 may have a so-called thermal system of ejecting the ink droplets with heat, or may have a so-called piezoelectric system of ejecting the ink droplets with pressure, and a well-known system is applied.

The ejecting head 122, for example, includes an ejecting head 122K which ejects the ink onto the continuous paper P and records a K (black) image, an ejecting head 122Y which records a Y (yellow) image, an ejecting head 122M which records a M (magenta) image, and an ejecting head 122C which records a C (cyan) image. The ejecting head 122K, the ejecting head 122Y, the ejecting head 122M, and the ejecting head 122C are arranged in this order from an upstream side to a downstream side along the feeding direction of the continuous paper P (hereinafter, may be simply referred to as a "sheet feeding direction") so as to oppose the continuous paper P. In addition, when referring to the ejecting heads, K, Y, M, and C with the reference numerals omitted, it is not necessary to differentiate the ejecting heads as K, Y, M, and C.

The four ejecting heads 122 are not limited to be disposed corresponding to four colors described above, and four or more ejecting heads 122 may be disposed to correspond to four or more colors including other intermediate colors, according to the purpose.

Herein, as the ejecting head 122, the ejecting head 122 for low resolution (for example, ejecting head with 600 dpi) which ejects the ink with an ink droplet amount in a range of 1 pl to 15 pl, or the ejecting head 122 for high resolution (for example, ejecting head with 1200 dpi) which ejects the ink with an ink droplet amount in a range of less than 10 pl is used. The ejecting device 121 may include both the ejecting head 122 for low resolution and the ejecting head 122 for high resolution. The ink droplet amount of the ejecting head 122 is in a range of maximum ink droplet amount of the ink. In addition, dpi stands for "dot per inch".

In the ejecting device 121, a drying drum 126 (one example of a drying device) on which a back surface of the continuous paper P is wound and which comes in contact with the transported continuous paper P and dries an image (ink) on the continuous paper P while being rotatably driven is, for example, disposed downstream of the ejecting head 122 in the sheet feeding direction.

A heat source (for example, a halogen heater or the like (not shown)) is embedded in the drying drum 126. The drying drum 126 dries the image (ink) on the continuous paper P by performing heating with the heat source.

Warm air blowing devices 128 (one example of the drying device) which dry the image (ink) on the continuous paper P are disposed around the drying drum 126. The image (ink) on the continuous paper P wound on the drying drum 126 is dried by warm air blown by the warm air blowing devices 128.

Herein, in the ejecting device 121, a near infrared heater (not shown) which dries the image (ink) on the continuous paper P may be disposed downstream of the ejecting head 122 in the sheet feeding direction. The near infrared heater is disposed instead of at least one of the drying drum 126 and the warm air blowing devices 128, or is disposed in addition to the drying drum 126 and the warm air blowing devices 128.

Meanwhile, the preprocessing unit 14 includes a supply roller 14A on which the continuous paper P to be supplied to the image recording unit 12 is wound, and this supply roller 14A is rotatably supported by a frame member (not shown).

A first pass roller 16A, a dancer roller 16B, and a second pass roller 16C are, for example, disposed along the sheet feeding direction, in the buffer unit 16. The dancer roller 16B moves vertically in FIG. 1, to adjust tension of the continuous paper P to be fed to the image recording unit 12 and to adjust the feeding amount of the continuous paper P.

The after-processing unit 18 includes a winding roller 18A as an example of a feeding unit which winds the continuous paper P on which an image is recorded. This winding roller 18A rotates with a rotational force from a motor (not shown) so that the continuous paper P is transported along the feeding path 124.

A first pass roller 20A, a dancer roller 20B, and a second pass roller 20C are, for example, disposed along the sheet feeding direction, in the buffer unit 20. The dancer roller 20B moves vertically in FIG. 1, to adjust tension of the continuous paper P to be discharged to the after-processing unit 18 and to adjust the feeding amount of the continuous paper P.

A plurality of cooling rollers 22A are disposed in the cooling unit 22. The continuous paper P is cooled by transporting the continuous paper P between the plurality of cooling rollers 22A.

Next, an operation (recording method) of the recording apparatus 10 according to the exemplary embodiment will be described.

In the recording apparatus 10 according to the exemplary embodiment, first, the continuous paper P is transported to the image recording unit 12 from the supply roller 14A of the preprocessing unit 14 through the buffer unit 16.

Then, the ink is ejected to the continuous paper P from each ejecting head 122 of the ejecting device 121 in the image recording unit 12. Accordingly, an image with ink is formed on the continuous paper P. After that, the image (ink) on the continuous paper P is dried from the back surface side of the continuous paper P (surface opposite the recorded surface) by the drying drum 126. The ink (image) ejected to the continuous paper P is dried from the surface side of the continuous paper P (recorded surface) by the warm air blowing devices 128. That is, the ink ejected to the continuous paper P is dried by the drying drum 126 and the warm air blowing devices 128.

Next, the continuous paper P on which the image is recorded is cooled by the cooling roller 22A in the cooling unit 22.

Then, the after-processing unit 18 winds the continuous paper P on which the image is recorded, by the winding roller 18A through the buffer unit 20.

With the steps described above, an image with the ink is recorded on the continuous paper P as the non-permeable recording medium P.

As the non-permeable recording medium P, coated paper or a resin film is used. Specifically, the non-permeable recording medium P means a recording medium in which a maximum liquid absorption amount of ink measured with a dynamic scanning liquid absorptiometer is equal to or less than 15 ml/m$^2$ during contact time of 500 ms.

Figure 2A:
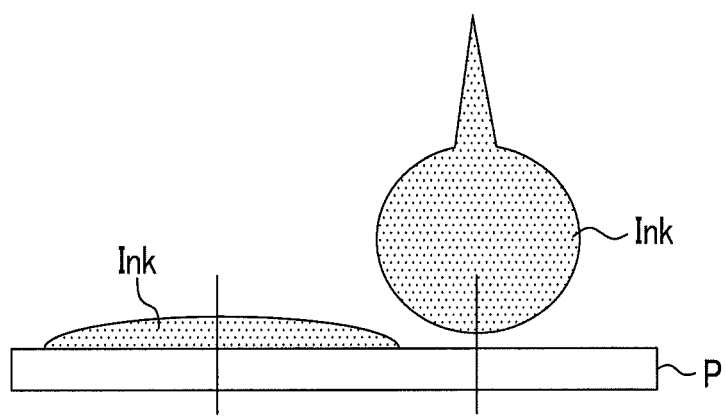
Figure 2B:
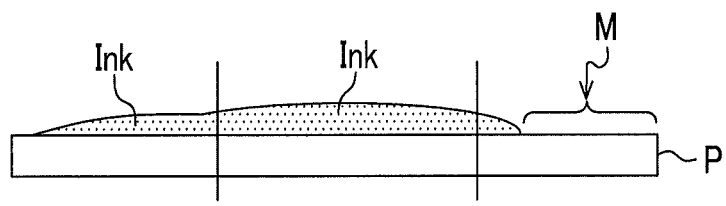
Figure 2C:
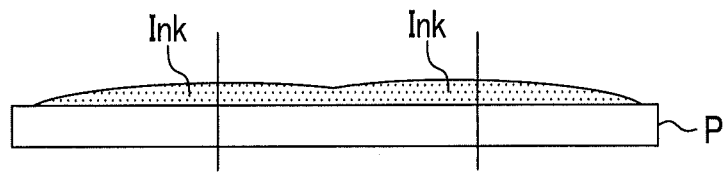

Herein, when the ink is ejected to the non-permeable recording medium P, the ink landed on the recording medium P does not permeate or unlikely permeates the recording medium P, and accordingly the ink droplets remain on the recording medium P with some height even when the ink droplets land (see FIG. 2A). Then, the ink droplets are spread on the recording medium P. When the later ink droplet lands to be adjacent to the previously landed ink droplet in this state, the later landed droplet comes in contact with and is coalesced with the ink droplet remaining adjacent thereto immediately before landing, and accordingly the later ink droplet may be deviated from a landing position (see FIG. 2B). In detail, the later ink droplet may be deviated from the landing position to the side of the previously landed ink droplet (FIG. 2B), compared to a case where landing interference of the later ink droplet does not occur (FIG. 2C). This is called landing interference, and is a reason for a stripe-like image defect (for example, an image defect of a white stripe with a base sheet visualized) due to the deviation of the ink droplet from the landing position. In FIGS. 2A to 2C, "Ink" denotes the ink. "M"

denotes the deviation of the landing position due to the landing interference of the ink droplet.

In order to suppress the landing interference, a technology of applying a solution for aggregating the previous ink droplet before the later ink droplet lands is used. However, a two-liquid system is difficult to be configured and is complicated to be controlled.

Therefore, in the recording apparatus 10 according to the exemplary embodiment, a first embodiment and a second embodiment described below are employed. Accordingly, even with a one-liquid system, the landing interference is suppressed and the stripe-like image defect is suppressed.

First Embodiment

In a case of including the ejecting head 122 for low resolution which ejects the ink with the ink droplet amount in a range of 10 pl to 15 pl onto the non-permeable recording medium P, an embodiment of applying aqueous ink (hereinafter, also referred to as "ink for low resolution") including a colorant, polymer particles, water, and an aqueous organic solvent, in which static surface tension is from 22 mN/m to 30 mN/m, and a difference between a value of dynamic surface tension after 10 msec and a value of dynamic surface tension after 1000 msec is equal to or smaller than 2 mN/m, when dynamic surface tension is measured with a maximum bubble pressure technique.

Second Embodiment

In a case of including the ejecting head 122 for high resolution which ejects the ink with the ink droplet amount in a range of less than 10 pl onto the non-permeable recording medium P, an embodiment of applying aqueous ink (hereinafter, also referred to as "ink for high resolution") including a colorant, polymer particles, water, and an aqueous organic solvent, in which static surface tension is from 22 mN/m to 30 mN/m, and a difference between a value of dynamic surface tension after 10 msec and a value of dynamic surface tension after 1000 msec is greater than 2 mN/m and equal to or smaller than 10 mN/m, when dynamic surface tension is measured with a maximum bubble pressure technique.

In addition, when dynamic surface tension is measured with a maximum bubble pressure technique, a difference between a value of dynamic surface tension after 10 msec and a value of dynamic surface tension after 1000 msec is also referred to as a "fluctuation range of dynamic surface tension".

Figure 3A:
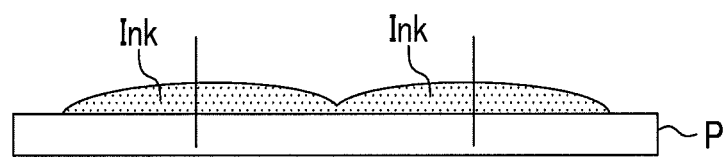
Figure 3B:
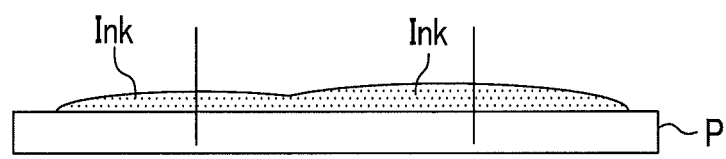

In the first embodiment, since there is a large amount of ink droplets to be ejected, the ink droplets easily spread on the recording medium P. Accordingly, it is difficult to suppress the spreading of the ink droplets on the recording medium P, and the ink droplet to be landed later comes in contact with the ink droplet remaining adjacent thereto immediately before the landing of the later ink droplet (see FIG. 3A). Therefore, the static surface tension is set in the range described above, and the fluctuation width of the dynamic surface tension is decreased, that is, the initial dynamic surface tension is decreased. Accordingly, the previously landed ink droplet spreads on the recording medium P in a state with the decreased surface tension. When the ink droplet has spread thereon, the ink droplet is rapidly dried and viscosity thereof is also increased. Although the ink droplet to be landed later is adjacent to the previously landed ink droplet and comes in contact with and is coalesced with the ink droplet remaining adjacent thereto immediately before landing in this state, a coalescing force is weakened (FIG. 3B). Thus, the landing interference is suppressed. As a result, the stripe-like image defect is suppressed. In addition, an irregular image defect is also easily suppressed. In FIGS. 3A and 3B, "Ink" denotes the ink.

Figure 4A:
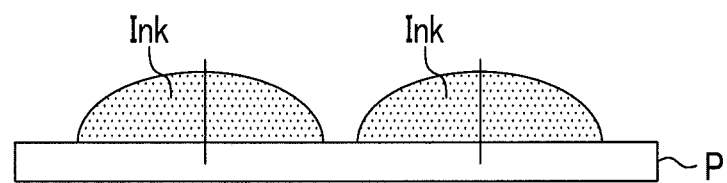
Figure 4B:
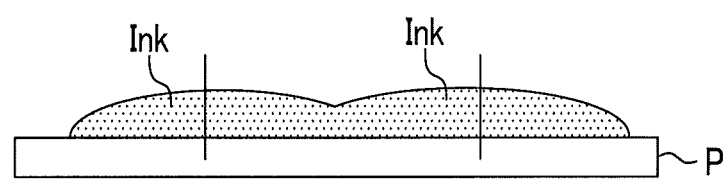

Meanwhile, in the second embodiment, since there is a small amount of ink droplets to be ejected, the ink droplets unlikely spread on the recording medium P. Therefore, the static surface tension is set in the range described above, and the fluctuation width of the dynamic surface tension is increased, that is, the initial dynamic surface tension is increased. Accordingly, the spreading of the previously landed ink droplet on the recording medium P is further suppressed. In this state, the ink droplet to be landed later is unlikely adjacent to the previously landed ink droplet and comes in contact with and is coalesced with the ink droplet remaining adjacent thereto immediately before landing (see FIG. 4A). After that, even when the previously landed ink droplet and the ink droplet landed later slowly spread on the recording medium P and are coalesced with each other, drying has been proceeded and the ink droplets are thickened, and accordingly the later ink droplet does not move to be deviated from the landing position (see FIG. 4B). Thus, the landing interference is suppressed. As a result, the stripe-like image defect is suppressed. In addition, an irregular image defect is also easily suppressed. In FIGS. 4A and 4B, "Ink" denotes the ink.

The reason for the suppressed stripe-like image defect of the first embodiment and the second embodiment described above is merely estimated and is not interpreted with any limitation.

In the recording apparatus 10 according to the exemplary embodiment, the drying drum 126 and the warm air blowing devices 128 are included, for example, as a drying device which dries the ink ejected onto the non-permeable recording medium P. The ink ejected onto the non-permeable recording medium P is dried with the drying device, and accordingly rapid recording is realized.

Hereinafter, the ink applied to the recording apparatus 10 according to the exemplary embodiment will be described in detail.

The ink for low resolution includes a colorant, polymer particles, water, and an aqueous organic solvent, and has a static surface tension of 22 mN/m to 30 mN/m and a fluctuation range of dynamic surface tension of smaller than 2 mN/m.

Meanwhile, the ink for high resolution has a static surface tension of 22 mN/m to 30 mN/m and a fluctuation range of dynamic surface tension of greater than 2 mN/m and equal to or smaller than 10 mN/m.

The static surface tension of both the ink for low resolution and the ink for high resolution is from 22 mN/m to 30 mN/m, and is preferably from 24 mN/m to 28 mN/m, from a viewpoint of ejection stability.

The static surface tension is a value measured in the environment of 23° C. and 55% RH, using a Wilhelmy-type surface tensiometer CBVP-Z (manufactured by Kyowa Interface Science Co., LTD.).

The fluctuation range of dynamic surface tension of the ink for low resolution is equal to or smaller than 2 mN/m, and is preferably from 0 mN/m to 1.5 mN/m and more preferably from 0 mN/m to 1 mN/m, from a viewpoint of the suppressing of the stripe-like image defect.

The fluctuation range of dynamic surface tension of the ink for high resolution is greater than 2 mN/m and is equal to or smaller than 10 mN/m, and is preferably from 2.1 mN/m to 8 mN/m and more preferably from 2.1 mN/m to 5 mN/m, from a viewpoint of the suppressing of the stripe-like image defect.

The fluctuation range of dynamic surface tension (difference between a value of dynamic surface tension after 10 msec and a value of dynamic surface tension after 1000 msec, when dynamic surface tension is measured with a maximum bubble pressure technique) is a value measured in the environment of 23° C. and 55% RH, using a dynamic surface tensiometer MPT C (manufactured by LAUDA) with a maximum bubble pressure technique.

The value of dynamic surface tension after 10 msec is a value of the dynamic surface tension when a new interface is formed on a capillary tip and bubble pressure thereof reaches the maximum bubble pressure in 10 msec. The value of dynamic surface tension after 1000 msec is a value of the dynamic surface tension when a new interface is formed on a capillary tip and bubble pressure thereof reaches the maximum bubble pressure in 1000 msec.

Herein, in the ink for low resolution, in order to set the fluctuation ranges of the static surface tension and the dynamic surface tension to the ranges described above, the ink for low resolution, for example, may preferably include a colorant, polymer particles, water, and an aqueous organic solvent, and an ethylene oxide adduct of acetylene glycol.

In the ink for low resolution, the content of the ethylene oxide adduct of acetylene glycol is, for example, preferably from 0.01% by weight to 10% by weight and more preferably from 0.1% by weight to 5% by weight, with respect to the ink.

Meanwhile, in the ink for high resolution, in order to set the fluctuation ranges of the static surface tension and the dynamic surface tension to the ranges described above, the ink for high resolution, for example, may preferably include a colorant, polymer particles, water, and an aqueous organic solvent, and an ethylene oxide adduct of acetylene glycol and polyether-modified silicone.

In the ink for high resolution, content of the ethylene oxide adduct of acetylene glycol is, for example, preferably from 0.01% by weight to 10% by weight and more preferably from 0.1% by weight to 5% by weight, with respect to the ink.

In addition, the content of the polyether-modified silicone is, for example, preferably from 0.01% by weight to 5% by weight and more preferably from 0.05% by weight to 1% by weight, with respect to the ink.

The ethylene oxide adduct of acetylene glycol is, for example, a compound having a —O—(CH$_2$CH$_2$O)n-H structure (for example, n represents an integer from 1 to 30) obtained by adding ethylene oxide to at least one hydroxyl group of acetylene glycol.

As a commercially available product of the ethylene oxide adduct of acetylene glycol, OLFINE E1010, OLFINE PD-002W, OLFINE EXP. 4001, OLFINE EXP. 4123, or OLFINE EXP. 4300 (all manufactured by Nissin Chemical Industry Co., Ltd.) is used, for example.

The polyether-modified silicone is a compound obtained by bonding a polyether group to a silicone chain (polysiloxane main chain) in a graft state or in a block state. As the polyether group, a polyoxyethylene group or a polyoxypropylene group is used, for example. The polyether group, for example, may be a polyoxyalkylene group in which an oxyethylene group and an oxypropylene group are added in a block state or randomly.

As a commercially available product of the polyether-modified silicone, SILFACE SAG002 or SILFACE SAG503A (all manufactured by Nissin Chemical Industry Co., Ltd.) is used.

Next, common ink composition and properties of the ink for low resolution and the ink for high resolution will be described. Hereinafter, both ink items are simply referred to as ink, and the ink composition and properties will be described.

A colorant will be described.

As a colorant, a pigment is used. As the pigment, an organic pigment and an inorganic pigment are used.

Specific examples of a black pigment include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, Raven 1060 (all manufactured by Columbian Carbon Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400 (all manufactured by Cabot Corporation), Color Black FW1, Color Black FW2, Color Black FW2V, Color Black 18, Color Black FW200, Color Black S150, Color Black S160, Color Black S170, Printex35, Printex U, Printex V, Printex140U, Printex140V, Special Black 6, Special Black 5, Special Black 4A, Special Black4 (all manufactured by Evonik Degussa GmbH), No. 25, No. 33, No. 40, No. 47, No. 52, No. 900, No. 2300, MCF-88, MA600, MA7, MA8, MA100 (all manufactured by Mitsubishi Chemical Corporation), and the like, but there is no limitation thereto.

Specific examples of a cyan pigment include C.I. Pigment Blue-1, C.I. Pigment Blue-2, C.I. Pigment Blue-3, C.I. Pigment Blue-15, C.I. Pigment Blue-15:1, C.I. Pigment Blue-15:2, C.I. Pigment Blue-15:3, C.I. Pigment Blue-15:4, C.I. Pigment Blue-16, C.I. Pigment Blue-22, C.I. Pigment Blue-60, and the like, but there is no limitation thereto.

Specific examples of a magenta pigment include C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-177, C.I. Pigment Red-184, C.I. Pigment Red-202, C.I. Pigment Violet-19, and the like, but there is no limitation thereto.

Specific examples of a yellow pigment include C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-138, C.I. Pigment Yellow-151, C.I. Pigment Yellow-154, C.I. Pigment Yellow-180, and the like, but there is no limitation thereto.

Herein, in a case where the pigment is used as the colorant, a pigment dispersant is preferably used in combination. As the pigment dispersant to be used, a polymer dispersant, an anionic surfactant, a cationic surfactant, an amphoteric surfactant, a nonionic surfactant, or the like is used.

As the polymer dispersant, a polymer including a hydrophilic structure part and a hydrophobic structure part is preferably used. As the polymer including a hydrophilic structure part and a hydrophobic structure part, a condensation polymer or an addition polymer is used, for example. As the condensation polymer, a well-known polyester dispersant is used. As the addition polymer, an addition polymer of a monomer including an α,β-ethylenically unsaturated group is used. A desired polymer dispersant is obtained by combining and copolymerizing a monomer including an α,β-ethylenically unsaturated group having a hydrophilic group and a monomer including an α,β-ethylenically unsaturated group having a hydrophobic group. In addition, a homopolymer of a monomer including α,β-ethylenically unsaturated group having a hydrophilic group is also used.

Examples of the monomer including an α,β-ethylenically unsaturated group having a hydrophilic group include monomers including a carboxyl group, a sulfonic acid group, a hydroxyl group, or a phosphoric acid group, for example, acrylic acid, methacrylic acid, crotonic acid, itaconic acid, itaconic acid monoester, maleic acid, maleic monoesters, fumaric acid, fumaric acid monoester, vinyl sulfonic acid, styrene sulfonic acid, sulfonated vinyl naphthalene, vinyl alcohol, acrylamide, methacryloxyethyl phosphate, bis methacryloxyethyl phosphate, methacryloxy ethyl phenyl acid phosphate, ethylene glycol dimethacrylate, diethylene glycol dimethacrylate, and the like.

Examples of the monomer including an α,β-ethylenically unsaturated group having a hydrophobic group include styrene derivatives such as styrene, α-methyl styrene, and vinyl toluene, vinyl cyclohexane, vinyl naphthalene, vinyl naphthalene derivatives, acrylic acid alkyl esters, methacrylic acid alkyl esters, methacrylic acid phenyl ester, methacrylic acid cycloalkyl ester, crotonic acid alkyl ester, itaconic acid dialkyl ester, maleic acid dialkyl ester, and the like.

Examples of a preferable copolymer as the polymer dispersant include a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, an acrylic acid alkyl ester-acrylic acid copolymer, a methacrylic acid alkyl ester-methacrylic acid copolymer, a styrene-methacrylic acid alkyl ester-methacrylic acid copolymer, a styrene-acrylic acid alkyl ester-acrylic acid copolymer, a styrene-methacrylic acid phenyl ester-methacrylic acid copolymer, a styrene-methacrylic acid cyclohexyl ester-methacrylic acid copolymer, and the like. In addition, a monomer including a polyoxyethylene group and a hydroxyl group may be copolymerized with these polymers.

The weight-average molecular weight of the polymer dispersant may preferably be, for example, from 2,000 to 50,000.

The polymer dispersant may be used alone or in combination of two or more kinds. The content of the polymer dispersant is not generally determined since it is largely different depending on the pigment, but it is preferably from 0.1% by weight to 100% by weight with respect to the pigment.

As the pigment, a pigment which performs self-dispersion to water (hereinafter, also referred to as a self-dispersion type pigment) is also used.

The self-dispersion type pigment indicates a pigment which includes a soluble group with respect to water on the surface of the pigment and disperses in water even without the existence of the polymer dispersant. The self-dispersion type pigment is obtained by performing surface modification treatment such as acid/base treatment, coupling agent treatment, polymer graft treatment, plasma treatment, or oxidation/reduction treatment with respect to the pigment.

In addition to the pigment subjected to the surface modification treatment with respect to the pigment, as the self-dispersion type pigment, commercially available self-dispersion type pigments such as Cab-o-jet-200, Cab-o-jet-300, Cab-o-jet-400, IJX-157, IJX-253, IJX-266, IJX-273, IJX-444, IJX-55, Cab-o-jet-250C, Cab-o-jet-260M, Cab-o-jet-270Y, Cab-o-jet-450C, Cab-o-jet-465M, Cab-o-jet-470Y, Cab-o-jet-480M all manufactured by Cabot Corporation, Microjet Black CW-1, CW-2, and the like manufactured by Orient Chemical Industries CO., Ltd. are used.

The self-dispersion type pigment is preferably a pigment including at least sulfonic acid, sulfonate, carboxylic acid, or carboxylic acid salt as a functional group on the surface thereof. The self-dispersion type pigment is more preferably a pigment including at least carboxylic acid or carboxylic acid salt as a functional group on the surface thereof.

Herein, as the pigment, a pigment coated with a resin is also used. This is called a microcapsule pigment, and a commercially available microcapsule pigment manufactured by DIC Corporation or Toyo Ink Co., Ltd. is used. The microcapsule pigment is not limited to the commercially available microcapsule pigment, and a microcapsule pigment manufactured according to the purpose may be used.

In addition, as the pigment, a resin dispersion type pigment in which a polymer compound is physically adsorbed to or chemically bonded to the pigment is also used.

Further, in addition to the black pigment and the pigments with three primary colors such as cyan, magenta, and yellow, as the pigment, a pigment with a specific color such as red, green, blue, brown, or white, a metal glossy pigment such as gold or silver, a colorless or light-colored extender pigment, or plastic pigment is also used.

Furthermore, as the pigment, particles obtained by using silica, alumina, and fixing a dye or a pigment on the surface thereof or polymer beads as a core, an insoluble lake compound of a dye, colored emulsion, or colored latex is also used.

In addition to the pigment, as the colorant, dyes such as a hydrophilic anionic dye, a direct dye, a cationic dye, a reactive dye, a polymer dye or an oil-soluble dye, wax powder•resin powder or emulsion colored with a dye, a fluorescent dye or a fluorescent pigment is also used.

A volume average particle size of the colorant is, for example, from 10 nm to 1,000 nm.

The volume average particle size of the colorant indicates a particle size of the colorant, or a particle size including an additive in a case where an additive such as a dispersant is attached to the colorant. The volume average particle size is measured using Microtrac UPA Particle size analyzer UPA-UT 151 (manufactured by Microtrac Inc.). 1000-fold diluted ink is inserted into a measurement cell to perform measurement. As input values when performing the measurement, viscosity of diluted ink solution is used as the viscosity and a refractive index of the colorant is used as a particle refractive index.

The content (concentration) of the colorant is, for example, preferably from 1% by weight to 25% by weight and more preferably from 2% by weight to 20% by weight with respect to the ink.

The polymer particles will be described.

The polymer particles are a component for improving fixability of an image with the ink with respect to the non-permeable recording medium.

Examples of the polymer particles include particles (latex particles) of a styrene-acrylic acid copolymer, a styrene-acrylic acid-sodium acrylate copolymer, a styrene-butadiene copolymer, polystyrene, an acrylonitrile-butadiene copolymer, a acrylate copolymer, polyurethanes, a silicon-acrylic acid copolymer, an acrylic-modified fluorine resin, or the like. As the polymer particles, core-shell type polymer particles having different compositions of a center part and an outer periphery part of the particles are also used.

The polymer particles may be dispersed in the ink using an emulsifier or may be dispersed in the ink without using an emulsifier. As the emulsifier, a surfactant, a polymer including a hydrophilic group such as a sulfonic acid group or a carboxylic group (for example, a polymer to which a hydrophilic group is graft-bonded, a polymer obtained from a monomer having a hydrophilic property and a monomer having a hydrophobic property) is used.

A volume average particle size of the polymer particles is preferably from 10 nm to 300 nm and more preferably from 10 nm to 200 nm, from viewpoints of gloss and rub fastness of an image.

The volume average particle size is measured using Microtrac UPA Particle size analyzer UPA-UT 151 (manufactured by Microtrac Inc.). 1,000-fold diluted ink is inserted into a measurement cell to perform measurement. As input values when performing the measurement, viscosity of diluted ink solution is used for the viscosity and a refractive index of the colorant is used for a particle refractive index.

A glass transition temperature of the polymer particles is preferably from $-20°$ C. to $80°$ C. and more preferably from $-10°$ C. to $60°$ C., from a viewpoint of rub fastness of an image.

The glass transition temperature of the polymer particles is acquired by a DSC curve obtained by differential scanning calorimetry (DSC), and more specifically, is acquired by "extrapolation glass transition starting temperature" disclosed in a method of acquiring the glass transition temperature of JIS K7121-1987 "Testing Methods for Transition Temperature of Plastics".

The content of the polymer particles is preferably, for example, from 0.1% by weight to 10% by weight and more preferably from 0.5% by weight to 5% by weight, with respect to the ink.

Water will be described.

As water, ion exchange water, ultrapure water, distilled water, or ultrafiltrated water is preferably used, particularly from a viewpoint of preventing mixing of impurities or generation of a microbe.

The content of water is preferably, for example, from 10% by weight to 95% by weight or more preferably from 30% by weight to 90% by weight with respect to the ink.

A water-soluble organic solvent will be described.

As the water-soluble organic solvent, polyols, a derivative of polyols, a nitrogen-containing solvent, alcohols, a sulfur-containing solvent or the like is used. In addition, as the water-soluble organic solvent, propylene carbonate, ethylene carbonate, or the like is also used.

Examples of polyols include sugar alcohols such as ethylene glycol, diethylene glycol, propylene glycol, butylene glycol, triethylene glycol, 1,5-pentanediol, 1,2-hexanediol, 1,2,6-hexane triol, glycerol, trimethylolpropane, or xylitol; sugars such as xylose, glucose, galactose; and the like.

Examples of the derivative of polyols include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, an ethylene oxide adduct of diglycerine, and the like.

Examples of the nitrogen-containing solvent include pyrrolidone, N-methyl-2-pyrrolidone, cyclohexyl pyrrolidone, triethanolamine, and the like.

Examples of alcohols include ethanol, isopropyl alcohol, butyl alcohol, benzyl alcohol, and the like.

Examples of the sulfur-containing solvent include thiodiethanol, thiodiglycerol, sulfolane, dimethyl sulfoxide, and the like.

The water-soluble organic solvent may be used alone or in combination of two or more kinds.

The content of the water-soluble organic solvent is preferably from 1% by weight to 60% by weight or more preferably from 1% by weight to 40% by weight with respect to water.

The surfactant will be described.

The surfactant may be included in the ink. Examples of the surfactant include an anionic surfactant, a nonionic surfactant, a cationic surfactant, an amphoteric surfactant, and the like, and an anionic surfactant and a nonionic surfactant are preferably used.

Examples of the anionic surfactant include alkyl benzene sulfonate, alkyl phenyl sulfonate, alkyl naphthalene sulfonate, higher fatty acid salts, sulfuric ester salts of higher fatty acid ester, sulfonates of higher fatty acid ester, sulfuric ester salts and sulfonates of higher alcohol ether, higher alkyl sulfosuccinate, polyoxyethylene alkyl ether carboxylate, polyoxyethylene alkyl ether sulfates, alkyl phosphates, polyoxyethylene alkyl ether phosphates, and the like.

Among them, as the anionic surfactant, dodecyl benzene sulfonate, isopropyl naphthalene sulfonate, mono butyl phenyl phenol sulfonate, mono butyl biphenyl sulfonate, dibutyl phenyl phenol disulfonate, and the like are preferable.

Examples of the nonionic surfactant include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerol fatty acid esters, sucrose fatty acid esters, polyoxyethylene alkylamines, polyoxyethylene fatty acid amides, alkyl alkanol amides, polyethylene glycol polypropylene glycol block copolymers, acetylene glycol, and the like.

Among them, as the nonionic surfactant, polyoxyethylene nonyl phenyl ether, polyoxyethylene octyl phenyl ether, polyoxyethylene dodecyl phenyl ether, polyoxyethylene alkyl ethers, polyoxyethylene fatty acid esters, sorbitan fatty acid esters, polyoxyethylene sorbitan fatty acid esters, fatty acid alkylolamides, polyethylene glycol polypropylene glycol block copolymers, acetylene glycol, and the like are preferably used.

In addition, examples of the nonionic surfactant also include a silicone-based surfactant such as a polysiloxane oxyethylene adduct; a fluorinated surfactant such as perfluoroalkyl carboxylates, perfluoroalkyl sulfonates, or oxyethylene perfluoroalkyl ether; a biosurfactant such as spiculisporic acid, rhamnolipid or lysolecithin; and the like.

The hydrophile-lipophile balance (HLB) of the surfactant is preferably in a range of, for example, 3 to 20, from a viewpoint of solubility.

The surfactant may be used alone or in combination of two or more kinds.

The content of the surfactant is preferably from 0.1% by weight to 10% by weight, more preferably from 0.1% by weight to 5% by weight, and even more preferably from 0.2% by weight to 3% by weight with respect to the ink.

The other additives will be described.

The ink may include other additives. Examples of the other additives include an ink ejection improving agent (polyethyleneimine, polyamines, polyvinylpyrrolidone, polyethylene glycol, ethyl cellulose, or carboxymethyl cellulose), a conductivity/pH regulator (compound of alkali metals such as potassium hydroxide, sodium hydroxide, or lithium hydroxide), a reactive diluent solvent, a penetrant, a pH buffer, an antioxidant, an antifungal agent, a viscosity modifier, a conductive material, a chelating agent, an ultraviolet absorber, an infrared absorber, and the like.

Preferable physical properties of the ink will be described.

pH of the ink is preferably in a range of 4 to 10 and more preferably in a range of 5 to 9.

Herein, for pH of the ink, a value measured with a pH/conductivity meter (MPC 227 manufactured by Mettler-Toledo International Inc.) in the environment at a temperature of 23±0.5° C. and humidity of 55±5% R.H. is used.

Conductivity of the ink is in a range of, for example, 0.01 S/m to 0.5 S/m, preferably in a range of 0.01 S/m to 0.25 S/m, and more preferably in a range of 0.01 S/m to 0.20 S/m.

The conductivity is measured with MPC 227 (pH/conductivity meter manufactured by Mettler-Toledo International Inc.).

Viscosity of the ink is in a range of, for example, 1.5 mPa·s to 30 mPa·s and preferably in a range of 1.5 mPa·s to 20 mPa·s.

The viscosity is measured using a measurement device of TV-20 (manufactured by TOKI SANGYO CO., LTD.) under the conditions of a measurement temperature of 23° C. and a shear rate of 1400 s$^{-1}$.

In the recording apparatus 10 according to the exemplary embodiment, the system of directly ejecting the ink droplets to the surface of the recording medium P by the ejecting device 121 (ejecting head 122) has been described, but there is no limitation thereto, and a system of ejecting the ink droplets to an intermediate transfer member and then transferring the ink droplets on the intermediate transfer member to the recording medium P may be used, for example.

In the recording apparatus 10 according to the exemplary embodiment, the system of ejecting the ink onto the continuous paper P as the recording medium P to record an image has been described, but a system of ejecting the ink onto a piece of paper (paper sheet) as the recording medium P to record an image may be used.

The exemplary embodiment is not interpreted with limitation and can be realized within a range satisfying the requirements of the present invention.

EXAMPLES

Hereinafter, the exemplary embodiment will be described in detail with Examples, but the exemplary embodiment is not limited to Examples.

Recording Apparatus 1

Preparation of Recording Apparatus Body

In the same configuration as the configuration shown in FIG. 1, a recording apparatus body (herein, a recording apparatus body with a system of performing recording on a paper sheet as the recording medium) including a piezoelectric head with 600 dpi output (maximum ink droplet amount of 11 pl) and a piezoelectric head with 1200 dpi output (maximum ink droplet amount of 9 pl) as the ejecting head of the ink is prepared.

Details of the prepared recording apparatus body are as follows.

Details of Recording Apparatus Body

Recording rate (recording medium feeding rate): 25 m/min

Set temperature of drying drum: 100° C.

Set temperature of warm air blowing devices: 100° C.

Non-permeable recording medium: "OK Top Coat Plus" (ream weight of 43 kg) manufactured by Oji Paper Co., Ltd.

Preparation of Ink

CAB-O-JET 400 (manufactured by Cabot Corporation): 8% by weight

TOCRYL W-4627 (acrylic emulsion; manufactured by Toyochem Co., Ltd.): 5% by weight (solid content) (polymer particles, volume average particle size=0.12 μm, glass transition temperature=45° C.)

Diethylene glycol: 5% by weight

Glycerin: 15% by weight

Surfactant (compound in Table 1): % by weight in Table 1

Ion exchange water: balance

After mixing the compositions described above, the mixture is filtrated with a filter of 5 μm and aqueous ink (black ink) is obtained. Cyan, magenta, and yellow ink items are also obtained in the same manner as described above except for changing the colorant.

The prepared ink items are filled in ink tanks of the recording apparatus body and this is set as a recording apparatus 1.

Recording Apparatuses 2 to 9 and Recording Apparatuses C1 to C5

Ink is prepared in the same manner as in the recording apparatus 1, except for changing the type and amount (% by weight) of the surfactant, according to Table 1. In the same manner as in the recording apparatus 1, the prepared ink items are filled in ink tanks of the recording apparatus body, and recording apparatuses 1 to 9 and recording apparatuses C1 to C5 are obtained.

Evaluation

Using each recording apparatus, the ink is ejected onto "OK Top Coat Plus" manufactured by Oji Paper Co., Ltd. as the non-permeable recording medium, from each piezoelectric head of piezoelectric head with 600 dpi output (maximum ink droplet amount of 11 pl) and the piezoelectric head with 1200 dpi output (maximum ink droplet amount of 9 pl), and a solid image of 1.5 cm×1.5 cm is recorded. Then, drying with the drying drum and the warm air blowing devices, and cooling with the cooling roller are performed. Through the steps described above, an image with the ink is recorded on the non-permeable recording medium.

The recorded image is visually observed, and image peeling due to drying failure, and a stripe-like or irregular image defect (image defect due to landing interference, ejection failure) are evaluated. Evaluation criteria are as follows.

Evaluation Criteria of Image Peeling

A+: No peeling of image is observed even with quaternary color (coverage of 400%)

A: No peeling of image is observed

B: A part of image is peeled off

C: Image is considerably peeled off and gets dirty

Evaluation Criteria of Stripe-Like or Irregular Image Defect

A+: Neither stripe-like image defect nor irregular image defect are observed.

A: Stripe-like image defect or irregular image defect is observed in a part of the image B: Stripe-like image defect or irregular image defect is observed in the entire image C: Stripe-like image defect and irregular image defect are observed in the entire image and it is difficult to recognize characters on the image.

TABLE 1

| | | Recording apparatus 1 | Recording apparatus 2 | Recording apparatus 3 | Recording apparatus 4 | Recording apparatus 5 |
|---|---|---|---|---|---|---|
| Surfactant (% by weight) | E1010 | 1 | 1 | 0.4 | 0.4 | 0.2 |
| | PD-002W | | | | | |
| | EXP.4001 | | | | | |
| | EXP.4123 | | 1 | | | |
| | EXP.4300 | | | | | |
| | SAG002 | | | | 0.2 | 0.1 |
| | SAG503A | | | 0.2 | | |
| Ink | Static surface tension (N/m) | 29 | 26 | 22 | 22 | 24 |
| | Fluctuation range of dynamic surface tension (N/m) | 1 | 1 | 7 | 10 | 3 |
| Ejecting head | Maximum ink droplet amount | 11 pl / 9 pl | 11 pl / 9 pl | 11 pl / 9 pl | 11 pl / 9 pl | 11 pl / 9 pl |
| Evaluation | Image peeling | A+ / A | A+ / A | A / A+ | A / A+ | A / A+ |
| | Stripe-like or irregular image defect | A+ / B | A+ / B | B / A | B / A | B / A |
| | Note | Ex. / Co. Ex. | Ex. / Co. Ex. | Co. Ex. / Ex. | Co. Ex. / Ex. | Co. Ex. / Ex. |

TABLE 2

| | | Recording apparatus 6 | Recording apparatus 7 | Recording apparatus 8 | Recording apparatus 9 |
|---|---|---|---|---|---|
| Surfactant (% by weight) | E1010 | 1 | 1 | 0.6 | 0.4 |
| | PD-002W | | | | |
| | EXP.4001 | 0.1 | | | |
| | EXP.4123 | | | 0.2 | |
| | EXP.4300 | | 0.1 | | |
| | SAG002 | | | | |
| | SAG503A | | | | 0.05 |
| Ink | Static surface tension (N/m) | 30 | 28 | 26 | 26 |
| | Fluctuation range of dynamic surface tension (N/m) | 8 | 2 | 5 | 6 |
| Ejecting head | Maximum ink droplet amount | 11 pl / 9 pl | 11 pl / 9 pl | 11 pl / 9 pl | 11 pl / 9 pl |
| Evaluation | Image peeling | A / A+ | A+ / A | A / A+ | A / A+ |
| | Stripe-like or irregular image defect | B / A+ | A+ / A+ | B / A+ | B / A+ |
| | Note | Co. Ex. / Ex. | Ex. / Ex. | Co. Ex. / Ex. | Co. Ex. / Ex. |

TABLE 3

| | | Recording apparatus C1 | Recording apparatus C2 | Recording apparatus C3 | Recording apparatus C4 | Recording apparatus C5 |
|---|---|---|---|---|---|---|
| Surfactant (% by weight) | E1010 | | 0.5 | | 0.5 | |
| | PD-002W | | 0.2 | | | |
| | EXP.4001 | 0.1 | | | | |
| | EXP.4123 | | | | | 1 |
| | EXP.4300 | | | | | |
| | SAG002 | | | | | |
| | SAG503A | | | 0.4 | | |
| Ink | Static surface tension (N/m) | 45 | 21 | 20 | 31 | 25 |
| | Fluctuation range of dynamic surface tension (N/m) | 11 | 1 | 14 | 2 | 11 |

TABLE 3-continued

|  |  | Recording apparatus C1 | | Recording apparatus C2 | | Recording apparatus C3 | | Recording apparatus C4 | | Recording apparatus C5 | |
|---|---|---|---|---|---|---|---|---|---|---|---|
| Ejecting head | Maximum ink droplet amount | 11 pl | 9 pl | 11 pl | 9 pl | 11 pl | 9 pl | 11 pl | 9 pl | 11 pl | 9 pl |
| Evaluation | Image peeling | C | C | A | A | B | B | C | B | C | B |
|  | Stripe-like or irregular image defect | C | C | C | C | C | C | B | C | B | C |
| Note |  | Co. Ex. | Co. Ex. | Co. Ex. | Co. Ex. | Co. Ex. | Co. Ex. | Co. Ex. | Co. Ex. | Co. Ex. | Co. Ex. |

From the results described above, in the recording apparatuses of Examples, it is found that the stripe-like image defect is suppressed, compared to the recording apparatuses in Comparative Examples.

In addition, in the recording apparatuses of Examples, it is found that the irregular image defect and the image peeling are also suppressed, compared to the recording apparatuses in Comparative Examples.

Abbreviations in Table 1 to Table 3 are as follows.
Ethylene Oxide Adduct of Acetylene Diol
E1010: OLFINE E1010 (manufactured by Nissin Chemical Industry Co., Ltd.)
PD-002W: OLFINE PD-002W (manufactured by Nissin Chemical Industry Co., Ltd.)
EXP. 4001: OLFINE EXP. 4001 (manufactured by Nissin Chemical Industry Co., Ltd.)
EXP. 4123: OLFINE EXP. 4123 (manufactured by Nissin Chemical Industry Co., Ltd.)
EXP. 4300: OLFINE EXP. 4300 (manufactured by Nissin Chemical Industry Co., Ltd.)
Polyether-Modified Silicone
SAG002: SILFACESAG002 (manufactured by Nissin Chemical Industry Co., Ltd.)
SAG503A: SILFACE SAG503A (manufactured by Nissin Chemical Industry Co., Ltd.)

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording apparatus comprising:
    an ejecting head that ejects aqueous ink which includes a colorant, polymer particles, water, and an aqueous organic solvent, of which static surface tension is from 22 mN/m to 30 mN/m, and a difference between a value of dynamic surface tension after 10 msec and a value of dynamic surface tension before 30 msec is only equal to or smaller than 2 mN/m, when dynamic surface tension is measured with a maximum bubble pressure technique, in an ink droplet amount in a range of 10 pl to 15 pl.

2. The recording apparatus according to claim 1,
    wherein the aqueous ink includes an ethylene oxide adduct of acetylene glycol.

3. The recording apparatus according to claim 1, further comprising:
    a drying device that dries the aqueous ink ejected onto a non-permeable recording medium.

4. The recording apparatus according to claim 2, further comprising:
    a drying device that dries the aqueous ink ejected onto a non-permeable recording medium.

5. A recording method comprising:
    ejecting aqueous ink which includes a colorant, polymer particles, water, an aqueous organic solvent, of which static surface tension is from 22 mN/m to 30 mN/m, and a difference between a value of dynamic surface tension after 10 msec and a value of dynamic surface tension before 30 msec is only equal to or smaller than 2 mN/m, when dynamic surface tension is measured with a maximum bubble pressure technique, in an ink droplet amount in a range of 10 pl to 15 pl, onto a non-permeable recording medium.

6. The recording method according to claim 5,
    wherein the aqueous ink includes an ethylene oxide adduct of acetylene glycol.

7. The recording method according to claim 5, further comprising:
    drying the aqueous ink ejected onto the non-permeable recording medium.

8. The recording method according to claim 6, further comprising:
    drying the aqueous ink ejected onto the non-permeable recording medium.

* * * * *